(12) United States Patent
Herrera et al.

(10) Patent No.: US 12,352,274 B2
(45) Date of Patent: Jul. 8, 2025

(54) AXIAL BLOWER

(71) Applicant: MILWAUKEE ELECTRIC TOOL CORPORATION, Brookfield, WI (US)

(72) Inventors: Nathaniel A. Herrera, Oak Creek, WI (US); Adam F. Czerwonka, Mukwanago, WI (US); Marcus T. Jenkins, Wauwatosa, WI (US); Shannon C. Bartlett, Cedarburg, WI (US); John L. Whealon, West Bend, WI (US); Drake J. Schlosser, Hartford, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 108 days.

(21) Appl. No.: 18/186,455

(22) Filed: Mar. 20, 2023

(65) Prior Publication Data

US 2023/0296102 A1 Sep. 21, 2023

Related U.S. Application Data

(60) Provisional application No. 63/330,883, filed on Apr. 14, 2022, provisional application No. 63/321,899, filed on Mar. 21, 2022.

(51) Int. Cl.
*F04D 25/06* (2006.01)
*F04D 19/00* (2006.01)
(Continued)

(52) U.S. Cl.
CPC ....... *F04D 25/0673* (2013.01); *F04D 19/002* (2013.01); *F04D 29/703* (2013.01); *F04D 25/084* (2013.01); *F04D 29/441* (2013.01)

(58) Field of Classification Search
CPC .. F04D 25/0673; F04D 19/002; F04D 29/703; F04D 25/084; F04D 29/441; A01G 20/47
(Continued)

(56) References Cited

U.S. PATENT DOCUMENTS

| 1,898,410 A | 2/1933 | Wales |
| 2,284,586 A | 5/1942 | McDermott |

(Continued)

FOREIGN PATENT DOCUMENTS

| CA | 2825035 A1 | 8/2012 |
| CN | 2053083 U | 2/1990 |

(Continued)

OTHER PUBLICATIONS

Extended European Search Report for Application No. 23163197.9 dated Oct. 30, 2023 (8 pages).

(Continued)

*Primary Examiner* — Charles G Freay
*Assistant Examiner* — Benjamin Doyle
(74) *Attorney, Agent, or Firm* — Dority & Manning, P.A.

(57) ABSTRACT

An axial blower includes a fan, housing, and intake grate. The fan has a rotational axis. The housing surrounds the fan. The housing includes an inlet, fluid intake volume, outlet, and battery interface. The inlet is disposed at a position along the rotational axis upstream of the fan. The fluid intake volume is upstream of the inlet. The outlet is disposed at a position along the rotational axis downstream of the fan. The distal projection extends away from the inlet in an upstream direction. The battery interface is coupled to the distal projection, upstream of the inlet, and suspends a battery pack in the fluid intake volume. The intake grate is positioned between the fluid intake volume and the inlet. The intake grate permits fluid flow between the fluid intake (Continued)

volume and the inlet. The fluid intake volume is unobstructed between the battery interface and the intake grate.

20 Claims, 4 Drawing Sheets

(51) Int. Cl.
  *F04D 25/08* (2006.01)
  *F04D 29/44* (2006.01)
  *F04D 29/70* (2006.01)
(58) Field of Classification Search
  USPC .......................................................... 417/411
  See application file for complete search history.

(56) References Cited

U.S. PATENT DOCUMENTS

| | | | |
|---|---|---|---|
| 2,768,782 A | 10/1956 | Tateishi | |
| 2,938,527 A | 5/1960 | Nichols | |
| 3,346,174 A | 10/1967 | Lievens et al. | |
| 3,407,431 A | 10/1968 | Melnik | |
| 3,540,547 A | 11/1970 | Coward, Jr. | |
| 4,185,688 A | 1/1980 | Wiater et al. | |
| 4,222,318 A | 9/1980 | Patton et al. | |
| 4,413,371 A | 11/1983 | Tuggle et al. | |
| 4,597,203 A | 7/1986 | Middleton | |
| 4,615,069 A | 10/1986 | Henning | |
| 4,692,091 A | 9/1987 | Ritenour | |
| 4,696,450 A | 9/1987 | Huang | |
| 4,734,017 A | 3/1988 | Levin | |
| 4,773,119 A | 9/1988 | Duthie et al. | |
| 4,792,286 A | 12/1988 | Gassen | |
| 4,794,225 A | 12/1988 | Maese | |
| 4,821,366 A | 4/1989 | Levine | |
| 4,838,151 A | 6/1989 | Shin-Chin | |
| 4,884,314 A | 12/1989 | Miner et al. | |
| 4,945,604 A | 8/1990 | Miner et al. | |
| 4,981,414 A | 1/1991 | Sheets | |
| 5,035,586 A | 7/1991 | Sadler et al. | |
| 5,195,208 A | 3/1993 | Yamami et al. | |
| 5,267,371 A | 12/1993 | Soler et al. | |
| 5,269,665 A | 12/1993 | Sadler et al. | |
| 5,383,427 A | 1/1995 | Tuggle et al. | |
| 5,511,281 A | 4/1996 | Webster | |
| 5,560,076 A | 10/1996 | Leung | |
| 5,701,631 A | 12/1997 | Lindquist | |
| 5,768,749 A | 6/1998 | Ohi et al. | |
| 5,821,473 A | 10/1998 | Takahashi | |
| 5,839,397 A | 11/1998 | Funabashi et al. | |
| 5,938,527 A | 8/1999 | Oshima et al. | |
| 5,975,862 A | 11/1999 | Arahata et al. | |
| 5,979,013 A | 11/1999 | Beckey et al. | |
| 6,006,400 A | 12/1999 | Presenza | |
| 6,105,206 A | 8/2000 | Tokumaru et al. | |
| 6,158,082 A | 12/2000 | Beckey et al. | |
| 6,244,823 B1 | 6/2001 | Marino et al. | |
| 6,305,048 B1 | 10/2001 | Salisian | |
| 6,324,720 B1 | 12/2001 | Beckey et al. | |
| 6,324,721 B1 | 12/2001 | Doragrip | |
| 6,370,729 B2 | 4/2002 | Miyamoto | |
| 6,442,790 B1 | 9/2002 | Svoboda et al. | |
| 6,464,459 B2 | 10/2002 | Illingworth | |
| 6,468,053 B2 | 10/2002 | Wölpert | |
| 6,497,553 B2 | 12/2002 | Illingworth et al. | |
| 6,514,036 B2 | 2/2003 | Marshall et al. | |
| 6,520,449 B2 | 2/2003 | Illingworth | |
| 6,543,726 B2 | 4/2003 | Illingworth | |
| 6,565,321 B1 | 5/2003 | Illingworth et al. | |
| 6,575,695 B1 | 6/2003 | Miyamoto | |
| 6,595,753 B1 | 7/2003 | Illingworth et al. | |
| 6,616,094 B2 | 9/2003 | Illingworth | |
| 6,619,922 B2 | 9/2003 | Illingworth et al. | |
| 6,623,352 B2 | 9/2003 | Illingworth | |
| 6,687,951 B2 | 2/2004 | Illingworth et al. | |
| 6,689,225 B2 | 2/2004 | Illingworth | |
| 6,719,830 B2 | 4/2004 | Illingworth et al. | |
| 6,729,839 B1 | 5/2004 | Illingworth et al. | |
| 6,802,693 B2 | 10/2004 | Reinfeld et al. | |
| 6,802,881 B2 | 10/2004 | Illingworth et al. | |
| 6,811,687 B2 | 11/2004 | Illingworth | |
| 6,857,163 B2 | 2/2005 | Lida et al. | |
| 6,881,025 B2 | 4/2005 | Illingworth et al. | |
| 6,957,472 B2 | 10/2005 | Illingworth et al. | |
| 6,960,063 B2 | 11/2005 | Reinfeld et al. | |
| 7,055,213 B2 | 6/2006 | Iida et al. | |
| 7,143,468 B2 | 12/2006 | Illingworth et al. | |
| 7,300,484 B2 | 11/2007 | Scully et al. | |
| 7,600,290 B1 | 10/2009 | Peters | |
| 7,607,244 B2 | 10/2009 | Hishida | |
| 7,735,188 B2 | 6/2010 | Shaffer | |
| 7,774,896 B2 | 8/2010 | Andresen et al. | |
| 7,845,048 B1 | 12/2010 | Bailey et al. | |
| 7,850,513 B1 | 12/2010 | Parker et al. | |
| 7,922,470 B2 | 4/2011 | Joseph | |
| 7,941,894 B1 | 5/2011 | Skorput | |
| 8,266,762 B2 | 9/2012 | Hsu | |
| 8,449,589 B1 | 5/2013 | Harsy | |
| 8,510,910 B1 | 8/2013 | Ramsey | |
| 8,745,815 B2 | 6/2014 | Takano et al. | |
| 8,894,382 B2 | 11/2014 | Binder | |
| 8,918,956 B2 | 12/2014 | Pellenc | |
| 8,967,949 B2 | 3/2015 | Gamissans Bou | |
| 9,004,854 B2 | 4/2015 | Nakazawa | |
| 9,057,166 B2 | 6/2015 | Prager | |
| 9,167,751 B2 | 10/2015 | Thackery et al. | |
| 9,277,844 B1 | 3/2016 | Millan | |
| 9,364,125 B2 | 6/2016 | Takahashi | |
| 9,439,548 B2 | 9/2016 | Jenson | |
| 9,456,722 B2 | 10/2016 | Tomasiak et al. | |
| 9,538,711 B2 | 1/2017 | Mutoh et al. | |
| 9,603,497 B2 | 3/2017 | Yamaoka et al. | |
| 9,737,182 B2 | 8/2017 | Gindele et al. | |
| 9,861,242 B2 | 1/2018 | Tomasiak et al. | |
| 9,869,327 B2 | 1/2018 | Kodato et al. | |
| D812,825 S | 3/2018 | Smith et al. | |
| 9,970,445 B2 | 5/2018 | Kodato et al. | |
| 9,974,241 B2 | 5/2018 | Yamaoka et al. | |
| 9,991,825 B1* | 6/2018 | Ackerman | ............... H02P 7/06 |
| 10,000,900 B2 | 6/2018 | Yamaoka et al. | |
| 10,065,219 B2* | 9/2018 | Suzuki | ................ A01G 20/47 |
| 10,091,954 B1 | 10/2018 | Yamaoka et al. | |
| 10,227,988 B2 | 3/2019 | Gao et al. | |
| 10,232,502 B2 | 3/2019 | Bylund et al. | |
| 10,264,739 B2 | 4/2019 | Yamaoka et al. | |
| 10,267,323 B2 | 4/2019 | Patrick | |
| 10,306,843 B2 | 6/2019 | Thackery et al. | |
| 10,337,526 B2* | 7/2019 | Shao | .................... F04D 29/703 |
| 10,375,901 B2 | 8/2019 | Bermudez et al. | |
| 10,398,095 B2 | 9/2019 | Gao et al. | |
| 10,405,707 B2 | 9/2019 | Zhu et al. | |
| 10,487,850 B2 | 11/2019 | Shao et al. | |
| 10,670,048 B2 | 6/2020 | Landén et al. | |
| 10,674,681 B2 | 6/2020 | Bermudez et al. | |
| 10,722,085 B2 | 7/2020 | Gao et al. | |
| 10,774,487 B2 | 9/2020 | Yamaoka et al. | |
| 10,897,858 B2 | 1/2021 | Hoffman et al. | |
| 10,947,983 B2 | 3/2021 | Hoffman | |
| 2001/0054212 A1 | 12/2001 | Walker | |
| 2002/0060107 A1 | 5/2002 | Kamoshita et al. | |
| 2002/0148069 A1 | 10/2002 | Illingworth | |
| 2002/0155002 A1 | 10/2002 | Reinfeld et al. | |
| 2002/0176777 A1 | 11/2002 | Reinfeld et al. | |
| 2002/0176778 A1 | 11/2002 | Reinfeld et al. | |
| 2002/0182077 A1 | 12/2002 | Reinfeld et al. | |
| 2002/0182078 A1 | 12/2002 | Reinfeld et al. | |
| 2003/0033689 A1 | 2/2003 | Marshall et al. | |
| 2003/0136094 A1 | 7/2003 | Illingworth et al. | |
| 2003/0150198 A1 | 8/2003 | Illingworth et al. | |
| 2003/0167741 A1 | 9/2003 | Illingworth et al. | |
| 2003/0221399 A1 | 12/2003 | Hall | |
| 2004/0018089 A1 | 1/2004 | Illingworth et al. | |
| 2004/0091357 A1 | 5/2004 | Reinfeld et al. | |
| 2004/0139709 A1 | 7/2004 | Illingworth et al. | |

(56) References Cited

U.S. PATENT DOCUMENTS

| | | |
|---|---|---|
| 2004/0139710 A1 | 7/2004 | Illingworth et al. |
| 2004/0159109 A1 | 8/2004 | Harvie |
| 2006/0182502 A1 | 8/2006 | Schliemann et al. |
| 2007/0209346 A1 | 9/2007 | Bovo et al. |
| 2007/0294855 A1 | 12/2007 | Iida et al. |
| 2008/0089785 A1 | 4/2008 | Schliemann et al. |
| 2008/0098703 A1 | 5/2008 | Lucas et al. |
| 2008/0141541 A1 | 6/2008 | Hurley |
| 2009/0038108 A1 | 2/2009 | Shaanan et al. |
| 2009/0078485 A1 | 3/2009 | Gutsch et al. |
| 2009/0241285 A1 | 10/2009 | Hinklin et al. |
| 2009/0282642 A1 | 11/2009 | Batchelder et al. |
| 2010/0003149 A1 | 1/2010 | Nelson |
| 2010/0192314 A1 | 8/2010 | Otsuka et al. |
| 2010/0247316 A1 | 9/2010 | Aynsley et al. |
| 2011/0146023 A1 | 6/2011 | Wada et al. |
| 2011/0197389 A1* | 8/2011 | Ota ................... H02J 7/007182 429/121 |
| 2012/0093490 A1 | 4/2012 | Steinberg |
| 2012/0096672 A1 | 4/2012 | Hatano et al. |
| 2012/0138058 A1 | 6/2012 | Fu et al. |
| 2013/0017079 A1 | 1/2013 | Armstrong et al. |
| 2013/0180495 A1 | 7/2013 | Veerathappa et al. |
| 2013/0183141 A1 | 7/2013 | Tan |
| 2013/0206172 A1 | 8/2013 | Bjar et al. |
| 2014/0021203 A1 | 1/2014 | Walker et al. |
| 2014/0050600 A1* | 2/2014 | Kodato ................. A01G 20/47 417/360 |
| 2014/0056738 A1 | 2/2014 | Takahashi |
| 2014/0086728 A1 | 3/2014 | Engert et al. |
| 2014/0105749 A1 | 4/2014 | Pellenc et al. |
| 2014/0140861 A1 | 5/2014 | Pellenc |
| 2014/0230181 A1* | 8/2014 | Yamaoka ............... A01G 20/47 15/344 |
| 2015/0211535 A1* | 7/2015 | Kodato ............... F04D 29/5806 417/371 |
| 2015/0282356 A1 | 10/2015 | Takahashi et al. |
| 2015/0377253 A1 | 12/2015 | Shibata et al. |
| 2016/0108924 A1 | 4/2016 | Conrad et al. |
| 2016/0120131 A1 | 5/2016 | Conrad et al. |
| 2016/0169249 A1* | 6/2016 | Takahashi ............ F04D 29/667 417/423.14 |
| 2016/0198636 A1 | 7/2016 | Poole et al. |
| 2016/0216249 A1 | 7/2016 | Sass |
| 2016/0265540 A1 | 9/2016 | Tirone et al. |
| 2016/0298635 A1 | 10/2016 | Su et al. |
| 2016/0305438 A1 | 10/2016 | Yamamoto et al. |
| 2016/0324380 A1 | 11/2016 | Sergyeyenko et al. |
| 2017/0021489 A1* | 1/2017 | Bylund ................. F04D 19/002 |
| 2017/0042096 A1 | 2/2017 | Bylund et al. |
| 2017/0045058 A1* | 2/2017 | Bylund ................. F04D 25/084 |
| 2017/0045246 A1 | 2/2017 | Kaleta et al. |
| 2017/0208748 A1 | 7/2017 | Yamaoka et al. |
| 2017/0241423 A1 | 8/2017 | Han et al. |
| 2017/0273251 A1 | 9/2017 | Haramoto et al. |
| 2017/0273252 A1 | 9/2017 | Haramoto et al. |
| 2018/0000014 A1 | 1/2018 | Yamaoka et al. |
| 2018/0087513 A1 | 3/2018 | Hoffman |
| 2018/0094393 A1 | 4/2018 | Takahashi et al. |
| 2018/0140146 A1* | 5/2018 | Zhu ..................... F04D 25/084 |
| 2018/0146628 A1 | 5/2018 | Huo et al. |
| 2018/0146682 A1 | 5/2018 | Beau et al. |
| 2018/0209429 A1 | 7/2018 | Ishida |
| 2019/0021243 A1 | 1/2019 | Naka et al. |
| 2019/0075639 A1* | 3/2019 | Brueck ................. H02K 9/06 |
| 2019/0098844 A1* | 4/2019 | Yang ................... A01G 20/47 |
| 2019/0162192 A1 | 5/2019 | Gao et al. |
| 2019/0191638 A1 | 6/2019 | Yamaoka et al. |
| 2019/0211830 A1 | 7/2019 | Liu et al. |
| 2019/0320598 A1 | 10/2019 | Bermudez et al. |
| 2020/0096001 A1* | 3/2020 | Chung ................. F04D 27/004 |
| 2020/0096006 A1 | 3/2020 | Shao et al. |
| 2020/0214229 A1* | 7/2020 | Yamaoka ............... F04D 29/403 |
| 2021/0219503 A1* | 7/2021 | Olvera ................. A47L 9/2842 |
| 2021/0227758 A1 | 7/2021 | Bylund et al. |
| 2022/0136526 A1 | 5/2022 | Shao et al. |
| 2022/0408663 A1* | 12/2022 | Cooper ............... H01M 50/298 |
| 2023/0220851 A1* | 7/2023 | Yamaoka ............... F04D 29/545 417/423.14 |

FOREIGN PATENT DOCUMENTS

| | | |
|---|---|---|
| CN | 2580819 Y | 10/2003 |
| CN | 2628767 Y | 7/2004 |
| CN | 101135139 A | 3/2008 |
| CN | 101260833 A | 9/2008 |
| CN | 201968600 U | 9/2011 |
| CN | 202015678 U | 10/2011 |
| CN | 102296555 A | 12/2011 |
| CN | 202157288 U | 3/2012 |
| CN | 203270492 U | 11/2013 |
| CN | 103671175 A | 3/2014 |
| CN | 203498784 U | 3/2014 |
| CN | 104074155 A | 10/2014 |
| CN | 204126922 U | 1/2015 |
| CN | 104564839 A | 4/2015 |
| CN | 204722966 U | 10/2015 |
| CN | 204811640 U | 12/2015 |
| CN | 105248156 A | 1/2016 |
| CN | 205276194 U | 6/2016 |
| CN | 106284148 A | 1/2017 |
| CN | 106284149 A | 1/2017 |
| CN | 106284153 A | 1/2017 |
| CN | 205999837 U | 3/2017 |
| CN | 206090426 U | 4/2017 |
| CN | 206289575 U | 6/2017 |
| CN | 107201734 A | 9/2017 |
| CN | 206480689 U | 9/2017 |
| CN | 107269550 A | 10/2017 |
| CN | 206815252 U | 12/2017 |
| CN | 107532604 A | 1/2018 |
| CN | 207498881 U | 6/2018 |
| CN | 207582389 U | 7/2018 |
| CN | 108476871 A | 9/2018 |
| CN | 212508973 U | 2/2021 |
| DE | 3812105 A1 | 9/1988 |
| DE | 8815616 U1 | 2/1989 |
| DE | 19523339 A1 | 1/1996 |
| DE | 29921751 U1 | 2/2000 |
| DE | 102007037011 A1 | 2/2008 |
| DE | 102010054841 A1 | 6/2012 |
| DE | 202017106572 U1 | 1/2018 |
| EP | 0821872 A2 | 2/1998 |
| EP | 2617281 A1 | 7/2013 |
| FR | 2224713 A1 | 10/1974 |
| FR | 2840172 A1 | 12/2003 |
| GB | 958481 A | 5/1964 |
| GB | 2156962 A | 10/1985 |
| GB | 2390118 A | 12/2003 |
| GB | 2513230 A | 10/2014 |
| JP | H0214790 A | 1/1990 |
| JP | 2749885 B2 | 5/1998 |
| JP | 2000018720 A | 1/2000 |
| JP | 2009264300 A | 11/2009 |
| JP | 2014037818 A | 2/2014 |
| KR | 101048421 B1 | 7/2011 |
| KR | 20110009355 U | 10/2011 |
| KR | 200458939 Y1 | 12/2012 |
| KR | 102042387 B1 | 11/2019 |
| WO | WO0073662 A1 | 12/2000 |
| WO | WO2011097157 A1 | 8/2011 |
| WO | WO2012140825 A1 | 10/2012 |
| WO | WO2014119175 A1 | 8/2014 |
| WO | WO2017101666 A1 | 6/2017 |
| WO | WO2017118276 A1 | 7/2017 |
| WO | WO2018164145 A1 | 9/2018 |
| WO | WO2019062279 A1 | 4/2019 |

OTHER PUBLICATIONS

Black & Decker, "20V Max* Lithium Sweeper" Instruction Manual, Model No. LSW20, Nov. 2011 (32 pages).

(56) References Cited

OTHER PUBLICATIONS

Black & Decker, "36V Lithium Hard Surface Sweeper Vac Instruction Manual," Model No. LSWV36, Jun. 2012 (44 pages).
Black & Decker, "Cordless Broom Instruction Manual," Catalog Nos. NS118, NS118L, Jun. 2011 (6 pages).
Black & Decker, "Heat Gun Instruction Manual," Catalog No. HG1300, Nov. 2010 (32 pages).
Black & Decker, "Instruction Manual," Catalog No. BV2500, BV9000, May 2004 (4 pages).
Black & Decker, "Straight Tube Blower / Sweeper," Instruction Manual, Catalog No. BL950, Aug. 2003 (3 pages).
Black & Decker, "Sweeper," Instruction Manual, Catalog No. CS100, © 2003 (4 pages).
Charles & Hudson, "Stihl BGA 85 Electric Leaf Blower," <https://www.youtube.com/watch?v=JMK4zdlUbbY> YouTube video publicly available at least as early as Feb. 25, 2012.
Dewalt, "D26950, D26960 Heavy-Duty Heat Gun," Instruction Manual © 2009 (7 pages).
E Magazine, "Blow, Leaves, Blow," Sep./Oct. 2012, p. 36.
Greenworks, "24V Lithium-Ion Cordless Blower 24352," Owner's Manual, Apr. 24, 2014 (18 pages).
Greenworks, "40V Brushless Blower/Vac 24322," Owner's Manual, Jul. 25, 2013 (13 pages).
Greenworks, "40V Lithium-ion Cordless Blower 24212," Owner's Manual, Dec. 24, 2012 (20 pages).
Greenworks, "40V Lithium-Ion Cordless Blower 24252," Owner's Manual, Jan. 15, 2013 (20 pages).
Kobalt Tools, "Kobalt 40-Volt Max* Blower," <https://web.archive.org/web/20150509211919/http://kobalttools.com:80/ . . . > web page publicly available at least as early as May 2015.
Leister, "Hot Air Blower, Hotwind Premium Hotwind System," Brochure, May 2011 (4 pages).
Machine Design, " Leaf Removal is a Breeze," Feb. 24, 2000, pp. 60, 62.
Milwaukee Tool, "M18™ Fuel™ Blower," service parts list bulletin No. 54-05-2705 dated Aug. 2019 (2 pages).
Outdoor Power Equipment, "DR Power introduces lithium-ion battery-powered hand tools," Jul. 2012, p. 60.
Popular Mechanics, "Leaf Mover and Shaker," Oct. 2009, p. 28.
Pro Tool Reviews, "Kobalt 40V Max Lithium-Ion Mower, Blower, and Chainsaw," <https://web.archive.org/web/20140630170346/http://www.protoolreviews.com/tools/outdoor-eq . . . > web page publicly available at least as early as Jun. 2014.
Remington, "18 Volt Cordless Blower RM170B," Operator's Manual, Apr. 2011 (12 pages).
Ryobi, "18 Volt Blower, P2100, P2100A, P2100B," Operator's Manual, Rev. 04, Feb. 25, 2008 (14 pages).
Shop Vac, "Wet/Dry Vacuum," Manual © 2013 (15 pages).
Steinel, "Electronic Heat Guns," <https://web.archive.org/web/20121022121431/http://www.steinel.net/pro . . . > webpage available at least as early as Oct. 2012 (3 pages).
Steinel, "Heat Gun Handbook," © 2007 (28 pages).
Stihl, "Saving Green and Going Green by Choosing Orange," Article dated Feb. 2012 (2 pages).
Stihl, "STIHL BGA 85," Nov. 2010 Manual, © 2011 (30 pages).
Stihl, "Stihl BGA 85," Instruction Manual, © 2011 (56 pages).
Stihl, "Stihl BGA 85," Instruction Manual, © 2013 (60 pages).
Toolmonger, "This Shop-Vac Blows (But In A Good Way)," <https://toolmonger.com/2007/05/10/this-shop-vac-blows-but-in-a-good-way/> Article dated May 10, 2007 (3 pages).
Toro, "Rake and Vac™, Super, and Ultra Blower/Vacuum," Operator's Manual, © 2012 (6 pages).
Troy-Bilt "TB4300 / TB4300B Cordless Blower," Operator's Manual, Mar. 2016 (32 pages).
Worx, "18V Cordless Li-ion Blower/Sweeper, WG540," Manual © 2009 (10 pages).
Worx, "Cordless Li-ion Blower/Sweeper, WG545," Manual © 2015 (28 pages).

* cited by examiner

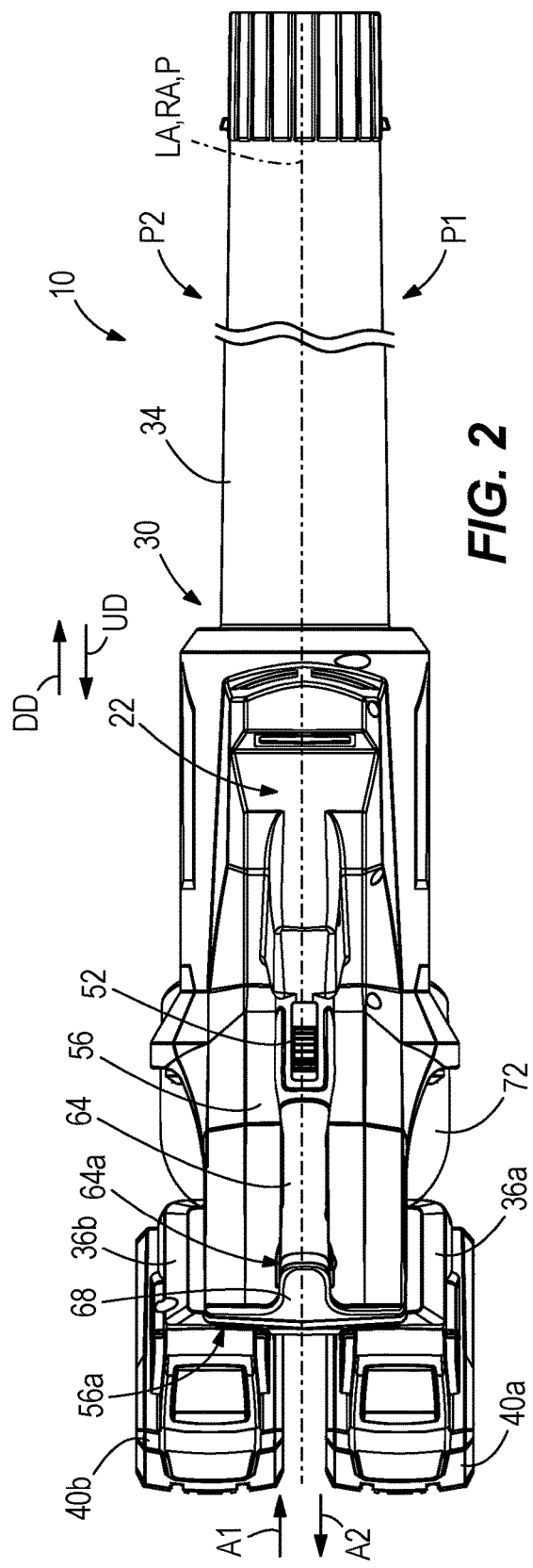
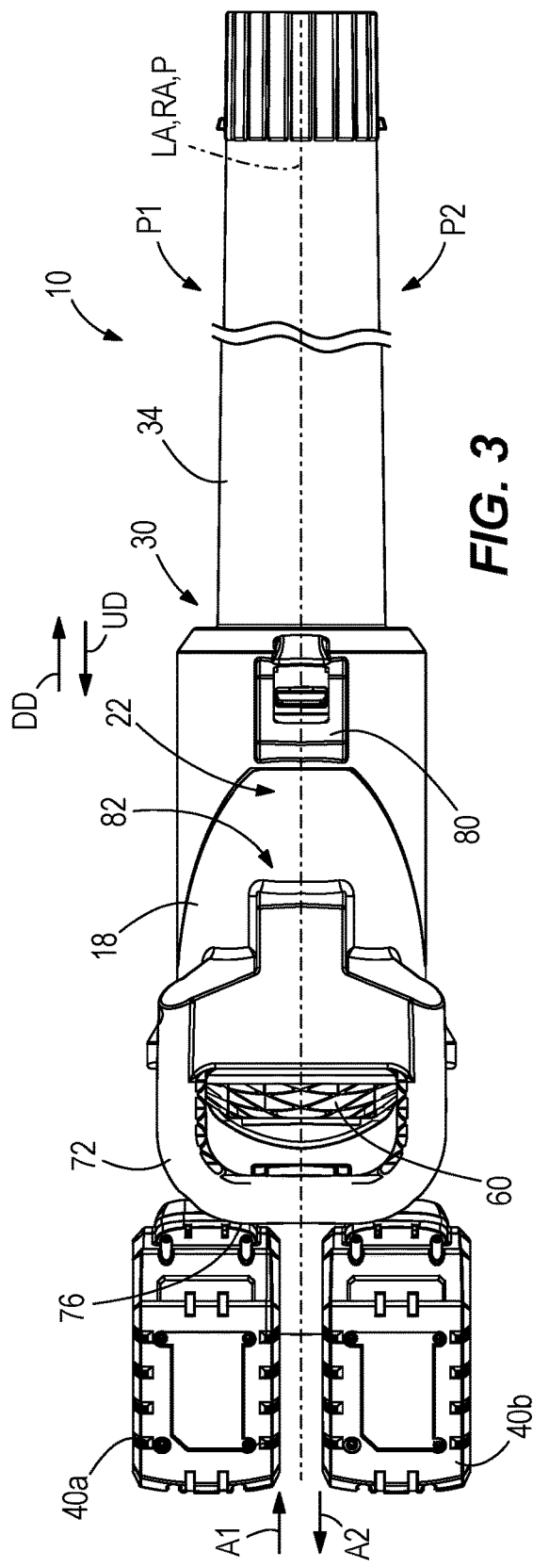

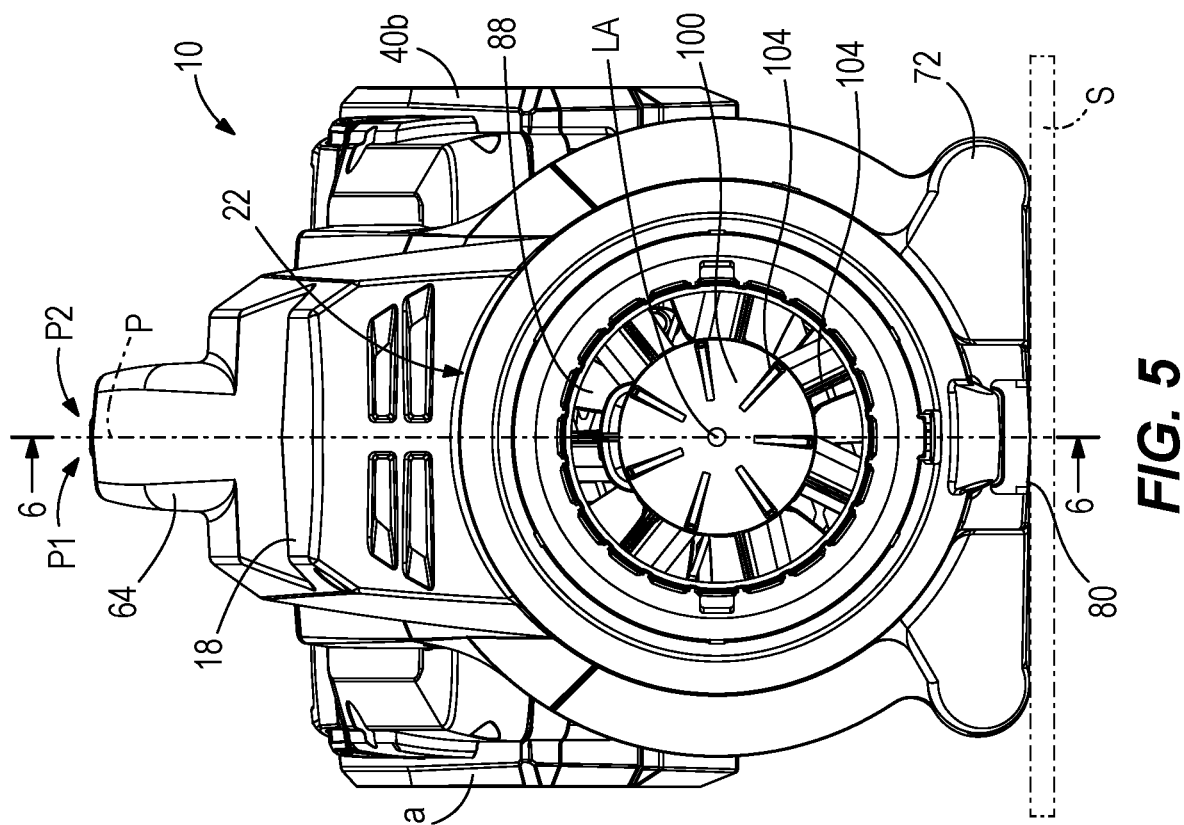
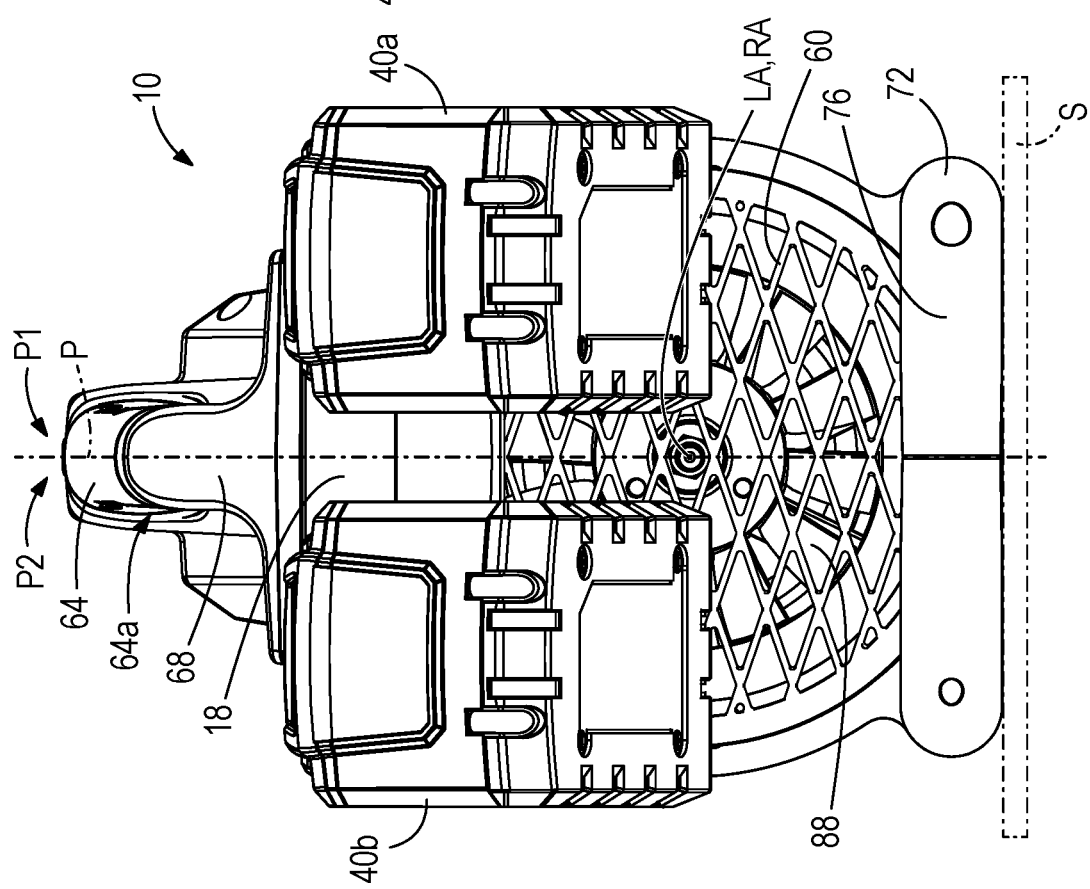

AXIAL BLOWER

CROSS-REFERENCE TO RELATED APPLICATIONS

This application claims priority to U.S. Provisional Application No. 63/321,899, filed Mar. 21, 2022, and to U.S. Provisional Application No. 63/330,883, filed Apr. 14, 2022, the entire contents of which are incorporated by reference herein.

FIELD

The present disclosure relates to blowers, and more particularly to axial blowers.

SUMMARY

In one independent aspect, an axial blower includes a fan, a housing, and an intake grate. The fan has a rotational axis. The housing surrounds the fan. The housing includes an inlet, a fluid intake volume, an outlet, and a battery interface. The inlet is disposed at a position along the rotational axis upstream of the fan. The fluid intake volume is upstream of the inlet. The outlet is disposed at a position along the rotational axis downstream of the fan. The distal projection extends away from the inlet in an upstream direction. The battery interface is coupled to the distal projection, located upstream of the inlet, and configured to suspend a battery pack therefrom to position the battery pack in the fluid intake volume. The intake grate is positioned between the fluid intake volume and the inlet, the intake grate being configured to permit fluid flow between the fluid intake volume and the inlet. The fluid intake volume is unobstructed between the battery interface and the intake grate.

In another independent aspect, an axial blower includes a fan having a rotational axis and a housing surrounding the fan. The housing includes an inlet, an outlet, a distal projection, a first battery interface, and a second battery interface. The inlet is disposed at a position along the rotational axis upstream of the fan. The outlet is disposed at a position along the rotational axis downstream of the fan. The distal projection extends away from the inlet in an upstream direction, the distal projection being intersected by a plane that is co-planar with the rotational axis. The first battery interface is coupled to the distal projection on a first lateral side of the plane. The second battery interface is coupled to the distal projection on a second lateral side of the plane, the second lateral side being opposite the first lateral side.

In another independent aspect, an axial blower includes a housing, a fan, and a fluid intake volume. The housing includes an inlet, an outlet opposite the inlet, a distal projection extending away from the inlet in an upstream direction, a battery interface coupled to the distal projection, the battery interface located upstream of the inlet, and a foot including a free end, the free end being upstream of the inlet. The fan has a rotational axis, the rotational axis passing through the inlet and the outlet. The fluid intake volume is defined at least partially between the distal projection and the free end of the foot.

BRIEF DESCRIPTION OF THE DRAWINGS

FIG. 2 is a top view of the blower of FIG. 1.

FIG. 3 is a bottom view of the blower of FIG. 1.

FIG. 4 is a rear view of the blower of FIG. 1.

FIG. 5 is a front view of the blower of FIG. 1.

Figure 1:
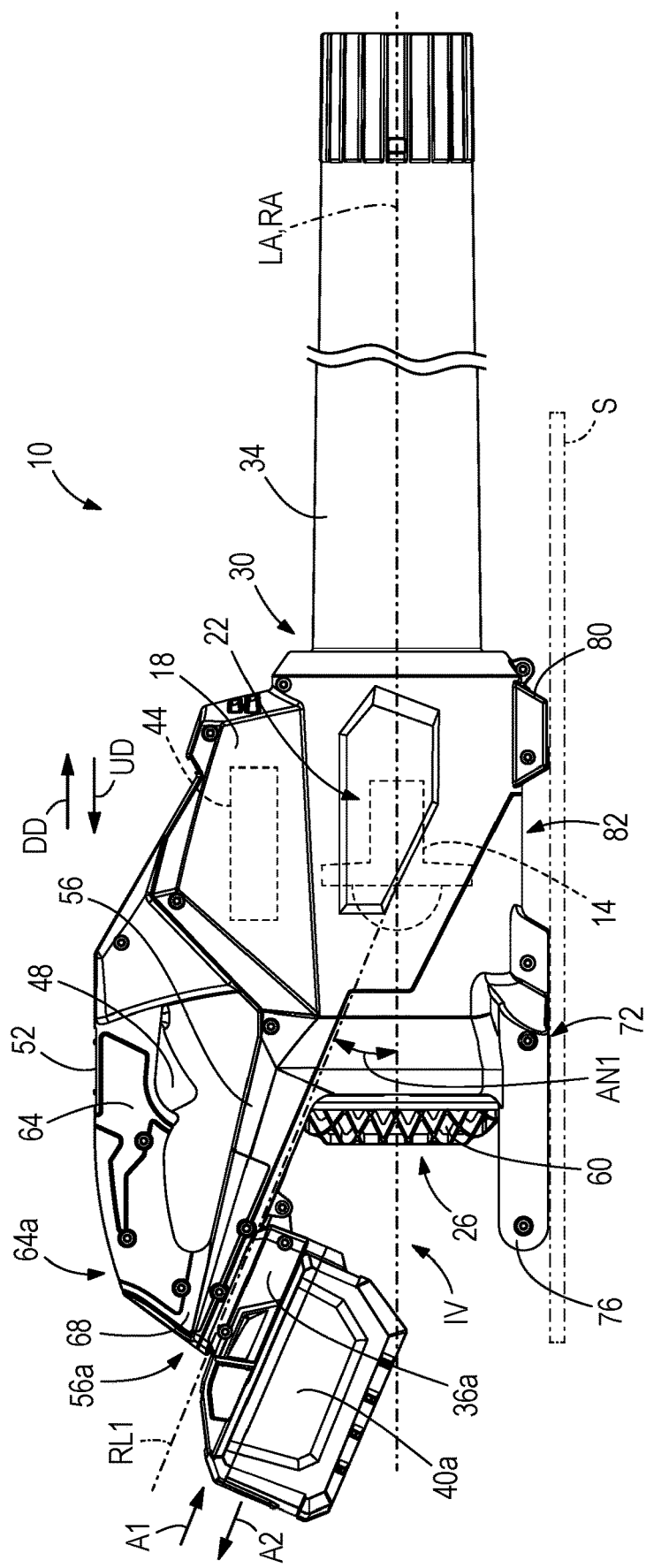
FIG. 1 is a side view of a blower according to embodiments disclosed herein.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-6 illustrate a blower 10 including a fan 14 positioned within a housing 18. In other words, the housing 18 surrounds the fan 14. More specifically, a fan portion 22 of the housing 18 surrounds the fan 14. The fan 14 is configured to rotate about a rotational axis RA. The rotational axis RA is coincident with a longitudinal axis LA of the housing 18. The housing 18 includes an inlet 26 disposed at a position along the rotational axis RA upstream of the fan 14. The housing 18 further includes an outlet 30 disposed at a position along the rotational axis RA downstream of the fan 14. The fan 14 is positioned between the inlet 26 and the outlet 30. The longitudinal axis LA passes through the fan 14 in the illustrated embodiment. The outlet 30 is axially opposite the inlet 26 with regard to the longitudinal axis LA. The rotational axis RA of the fan 14 passes through both the inlet 26 and the outlet 30. Accordingly, the blower 10 may be referred to as an axial blower. A fluid intake volume IV is positioned upstream of the inlet 26. The fluid intake volume IV provides fluid (e.g., air) from the surroundings of the blower 10 to be drawn into the housing 18 via the inlet 26 when the fan 14 is operated. The fan 14 then expels the fluid (e.g., air) from within the housing 18 out the outlet 30. Optionally, an exhaust tube 34 is coupled to the fan portion 22 to direct airflow (e.g., exhaust airflow generated by the fan 14).

With continued reference to FIG. 1, the blower 10 includes a battery interface 36a configured to receive a battery pack 40a. As will be described in detail below, the battery interface 36a is coupled to the housing 18. The battery interface 36a is electrically coupled to a printed circuit board assembly (PCBA) 44. The PCBA 44 is further electrically coupled to a trigger 48 and the fan 14. The PCBA 44 is configured to receive a signal from the trigger 48 upon actuation of the trigger 48. The signal received by the PCBA 44 from the trigger 48 may cause the PCBA 44 to draw electrical power from the battery pack 40a through the battery interface 36a. The electrical power may be directed to power the fan 14. Accordingly, the fan 14 is operated, and fluid (e.g., air) is drawn through the inlet 26 and expelled (i.e., blown) from the outlet 30.

The PCBA 44 may be further electrically coupled to a user interface 52 (FIG. 1). The user interface 52 may be actuated by a user in addition to actuation of the trigger 48 to control operation of the blower 10. The user interface 52 may provide, for example, a safety/lockout of the trigger 48, and/or a speed control of the fan 14. As illustrated in FIG. 1 (a side view of the blower 10), with the battery pack 40a coupled to the battery interface 36a, at least a portion of the battery pack 40a may be positioned below the rotational axis RA (i.e., the longitudinal axis LA). In other words, when the battery pack 40*a* engages the battery interface 36*a*, at least a portion of the battery pack 40*a* is on an opposite side of the rotational axis RA when compared to the battery interface 36*a*, the portion of the battery pack 40*a* being adjacent a foot 72 of the housing 18.

FIG. 1 illustrates various features of the housing 18. As previously mentioned, the fan 14 is provided within the fan portion 22 of the housing 18. In the illustrated embodiment, the PCBA 44 is also received within the fan portion 22 of the housing 18. The housing 18 further includes a distal projection 56 extending away from the inlet 26 in an upstream direction UD parallel to the longitudinal axis LA. A downstream direction DD opposes the upstream direction UD. The illustrated distal projection 56 extends along a reference line RL1 which extends away from the longitudinal axis LA at an angle AN1. In other words, the distal projection 56 extends transverse to the longitudinal axis LA. In the illustrated embodiment, the angle AN1 is approximately 20 degrees. In other embodiments, the angle AN1 may be equal to or between 0 degrees (e.g., parallel with the longitudinal axis LA) and 90 degrees (e.g., perpendicular with the longitudinal axis LA). In other embodiments, the angle AN1 may be between 5 and 85 degrees.

The battery interface 36*a* is coupled to the distal projection 56 such that the battery interface 36*a* is configured to suspend the battery pack 40*a* therefrom, with the battery pack 40*a* generally positioned between the longitudinal axis LA and the battery interface 36*a*. The battery interface 36*a* is located upstream of the inlet 26. When the battery pack 40*a* engages the battery interface 36*a*, as illustrated in FIG. 1, the battery pack 40*a* is positioned adjacent to the fluid intake volume IV such that the fluid passing into the inlet 26 passes next to the battery pack 40*a*. Generally speaking, the fluid intake volume IV is unobstructed between the battery interface 36*a* and the inlet 26. However, an intake grate 60 is positioned between the battery interface 36*a* and the inlet 26. The intake grate 60 projects in an upstream direction UD from the inlet 26. The intake grate 60 may permit fluid flow between the fluid intake volume IV and the inlet 26. The intake grate 60 may (e.g., by acting as a filter) inhibit debris from entering the inlet 26. Accordingly, the intake grate 60 does not provide an obstruction of the passage of fluid from the intake volume IV to the inlet 26. Optionally, the intake grate 60 is selectively removable from the housing 18 adjacent the inlet 26. The intake grate 60 may be removed to conduct maintenance on the interior of the blower 10 (e.g., the fan 14), to replace a damaged intake grate 60, or for any other reason.

With continued reference to FIG. 1, the housing 18 includes a handle portion 64 and a connector portion 68. The handle portion 64 engages the fan portion 22 and the connector portion 68. The connector portion 68 engages a rear end 64*a* of the handle portion 64 and a butt end 56*a* of the distal projection 56. The rear end 64*a* and the butt end 56*a* are each spaced from the inlet 26. The handle portion 64 extends generally parallel to the longitudinal axis LA. In the illustrated embodiment, the trigger 48 is positioned on the handle portion 64. The trigger 48 generally faces the distal projection 56 and the longitudinal axis LA, and may be depressed (e.g., actuated) in a direction away from the distal projection 56 and the longitudinal axis LA. In the illustrated embodiment, the user interface 52 is positioned on the handle portion 64. The user interface 52 generally faces away from the distal projection 56 and the longitudinal axis LA such that a user grasping the handle portion 64 may have an unobstructed line of sight to the user interface 52. The connector portion 68 extends generally transverse (e.g., perpendicular) to reference line RL1 and generally transverse to the longitudinal axis LA to connect the distal projection 56 and the handle portion 64. Accordingly, the connector portion 68 connects ends (e.g., the rear end 64*a* and the butt end 56*a*) of the distal projection 56 and the handle portion 64 which are furthest from the inlet 26. The battery interface 36*a* is positioned on the distal projection 56 closer to the butt end 56*a* of the distal projection 56 than the fan portion 22.

The housing 18 further includes the foot 72 (FIG. 1) configured to support the blower 10 upon a surface S. The foot 72 includes a free end 76. In the illustrated embodiment, the free end 76 is generally U-shaped (as shown in FIG. 3), the free end 76 extending from the fan portion 22. The free end 76 may be otherwise shaped. The fluid intake volume IV is defined at least partially between the distal projection 56 and the free end 76 of the foot 72. The free end 76 extends from the housing 18 in the upstream direction UD. The free end 76 is cantilevered from the housing 18. The free end 76 of the foot 72 is positioned further upstream (e.g., along the upstream direction UD) when compared to the inlet 26. The free end 76 of the foot 72 is positioned at a similar position along the longitudinal axis LA when compared to the battery interface 36*a*. When the battery pack 40*a* is coupled to the battery interface 36*a* (FIG. 1), a majority of the battery pack 40*a* is positioned upstream of the free end 76 in the upstream direction UD. The foot 72 is positioned closer to the inlet 26 than the outlet 30. The housing 18 further includes an auxiliary foot 80 positioned closer to the outlet 30 than the inlet 26. Together, the foot 72 and the auxiliary foot 80 can rest upon the surface S and inhibit the blower 10 from tipping. An intermediate portion 82 of the housing 18 is positioned between the foot 72 and the auxiliary foot 80. The intermediate portion 82 is recessed from the foot 72 and the auxiliary foot 80 such that when the foot 72 and the auxiliary foot 80 rest upon the surface S, the intermediate portion 82 does not contact the surface S.

With reference to FIGS. 2-5, the blower 10 may include two battery interfaces 36*a*, 36*b* each configured to receive a battery pack 40*a*, 40*b* and each electrically coupled to the fan 14, the PCBA 44, and the trigger 48. The battery interfaces 36*a*, 36*b* may be positioned at a same axial distance along the longitudinal axis LA relative to the inlet 26. As a result, only the battery pack 40*a* and the battery interface 36*a* are visible in FIG. 1. As illustrated in FIG. 2, the housing 18 may be provided as two clamshell halves 18*a*, 18*b*. The clamshell halves 18*a*, 18*b* may be generally split along a plane P (FIGS. 2-5) (e.g., a longitudinal plane) that is co-planar with the rotational axis RA and thus, the longitudinal axis LA. In other embodiments, clamshell halves 18*a*, 18*b* may be split by a different plane which is oriented differently than the longitudinal plane P. For example, other embodiments may have clamshell halves 18*a*, 18*b* are spaced laterally but otherwise parallel with the longitudinal plane P. Still other embodiments may have clamshell halves 18*a*, 18*b* split by differently oriented planes. The distal projection 56 is intersected by the plane P. In the illustrated embodiment, the distal projection 56 is bisected by the plane P. As shown in FIG. 2, for example, the battery interface 36*a* (i.e., a "first battery interface") is coupled to the distal projection 56 on a first lateral side P1 of the plane P. The battery interface 36*b* (i.e., a "second battery interface") is coupled to the distal projection 56 on a second lateral side P2 of the plane P. The second lateral side P2 is opposite the first lateral side P1. Accordingly, when the battery interface 36*a* receives the battery pack 40*a* (i.e., a "first battery"), the entirety of the battery pack 40*a* may be positioned on the first lateral side P1. Similarly, when the battery interface 36*b* receives the battery 40*b* (i.e., a "second battery"), the entirety of the battery 40*b* may be positioned on the second lateral side P2. The plane P may intersect and/or bisect many components of the blower 10 including but not limited to the handle portion 64, the trigger 48, the user interface 52, the fan 14, the PCBA 44, and the foot 72.

The battery packs 40*a*, 40*b* are selectively couplable to the battery interface 36*a*, 36*b*. While securing at least one of the battery packs 40*a*, 40*b* to the corresponding battery interface 36*a*, 36*b*, a user translates the battery pack 40*a*, 40*b* along an arrow A1 (FIGS. 1-3, 6) to engage the corresponding battery interface 36*a*, 36*b*. The arrow A1 is generally directed along the reference line RL1, and is thus transverse to the longitudinal axis LA. The arrow A1 generally is angled relative to the longitudinal axis LA by the angle AN1, and extends towards the inlet 26. The arrow A1 generally represents an insertion direction of the battery packs 40*a*, 40*b*. While removing at least one of the battery pack 40*a*, 40*b* from the corresponding battery interface 36*a*, 36*b*, the user translates the battery pack 40*a*, 40*b* along an arrow A2 (FIGS. 1-3, 6) to disengage the battery pack 40*a*, 40*b* from the corresponding battery interface 36*a*, 36*b*. The arrow A2 is angled relative to the longitudinal axis LA by the angle AN1, and extends away from the inlet 26. The arrow A2 generally represents a removal direction of the battery packs 40*a*, 40*b*. The arrow A2 generally opposes the arrow A1. As shown in FIG. 4, the battery packs 40*a*, 40*b*, when secured to the battery interfaces 36*a*, 36*b*, may permit fluid flow to the inlet 26 along an axial direction parallel to the longitudinal axis LA. In other words, at least a portion of the inlet 26 is offset in an axial direction parallel to the longitudinal axis LA from the battery packs 40*a*, 40*b*. Other types of battery packs 40*a*, 40*b* (e.g., "stick" battery packs), may be coupled to their corresponding battery interface 36*a*, 36*b* in different directions. For example, other battery packs 40*a*, 40*b* (e.g., "stick" battery packs) may be translated along arrows (not shown) which extend generally perpendicularly from the distal projection 56.

In some embodiments, each battery pack 40*a*, 40*b* is a high-performance battery pack 40*a*, 40*b*. In the illustrated embodiment, each battery pack 40*a*, 40*b* is a lithium-based. Other battery packs 40*a*, 40*b* may be nickel-based or have differing chemistries. The battery packs 40*a*, 40*b* may be a high-output battery pack (e.g., 6.0 Ah), such as the M18™ REDLITHIUM™ HIGH OUTPUT™ XC6.0 battery pack, manufactured and sold by Milwaukee Electric Tool, Milwaukee, Wis. Such battery packs 40*a*, 40*b* weighs approximately 2.3 pounds (1.0 kilograms).

These battery packs 40*a*, 40*b* and/or other compatible battery packs 40*a*, 40*b* may combine to provide up to 3000 Watts of input power (e.g., electrical input power) to the fan 14. This combination may include either one of the battery packs 40*a*, 40*b* or both the battery packs 40*a*, 40*b*. In some embodiments, the battery packs 40*a*, 40*b* may combine to provide between 1500-3000 Watts of input power (inclusive) to the fan 14. In some embodiments, the battery packs 40*a*, 40*b* may combine to provide between 1000-2000 Watts of input power (inclusive) to the fan 14. In some embodiments, the battery packs 40*a*, 40*b* may combine to provide between 500-1300 Watts of input power (inclusive) to the fan 14. In other words, the battery packs 40*a*, 40*b* may provide at least 500 Watts of input power to the fan 14. In some embodiments, the battery packs 40*a*, 40*b* may combine to provide approximately 1000 Watts of input power to the fan 14. In some embodiments, the battery packs 40*a*, 40*b* may combine to provide approximately 900 Watts of input power to the fan 14.

With a combined nominal voltage of the battery packs 40*a*, 40*b* (e.g., the battery pack 40*a* having a nominal voltage of 18 volts and the battery pack 40*b* having a nominal voltage of 18 volts) of 36 Volts operated at 25 Amps, the battery packs 40*a*, 40*b* may provide approximately 900 Watts of input power to the fan 14. With a combined nominal voltage of the battery packs 40*a*, 40*b* (e.g., the battery pack 40*a* having a nominal voltage of 18 volts and the battery pack 40*b* having a nominal voltage of 18 volts) of 36 Volts operated at 55.5 Amps, the battery packs 40*a*, 40*b* may provide at least 2000 Watts of input power to the fan 14. With a combined nominal voltage of the battery packs 40*a*, 40*b* (e.g., the battery pack 40*a* having a nominal voltage of 20 volts and the battery pack 40*b* having a nominal voltage of 20 volts) of 40 Volts operated at 25 Amps, the battery packs 40*a*, 40*b* may provide approximately 1000 Watts of input power to the fan 14. With a combined nominal voltage of the battery packs 40*a*, 40*b* (e.g., the battery pack 40*a* having a nominal voltage of 20 volts and the battery pack 40*b* having a nominal voltage of 20 volts) of 40 Volts operated at 55.5 Amps, the battery packs 40*a*, 40*b* may provide up to 3000 Watts of input power to the fan 14. Other configurations, combinations, and resultant input power to the fan 14 are possible.

Each battery pack 40*a*, 40*b* may be operable to provide at least 1000 Watts of electrical input power to the fan 14. In some embodiments, each battery pack 40*a*, 40*b* has an operating voltage of approximately 18 volts. Each battery pack 40*a*, 40*b* may have, for example, an output current of 6.0 amps. The blower 10 includes two battery packs 40*a*, 40*b*, each coupled to a corresponding battery interface 36*a*, 36*b*. Accordingly, the battery packs 40*a*, 40*b* of the blower 10 may provide a total of at least 2000 Watts of input power (e.g., electrical input power) to the fan 14. The illustrated blower 10 may have an operating voltage of approximately 36 volts, where each battery pack 40*a*, 40*b* provides an operating voltage of approximately 18 volts. In other embodiments, multiple (i.e., at least two) battery packs 40*a*, 40*b* may be electrically coupled to a single battery interface 36*a*. Other suitable battery packs 40*a*, 40*b* may have different operating voltages, output currents, power outputs, and/or different weights.

Figure 6:
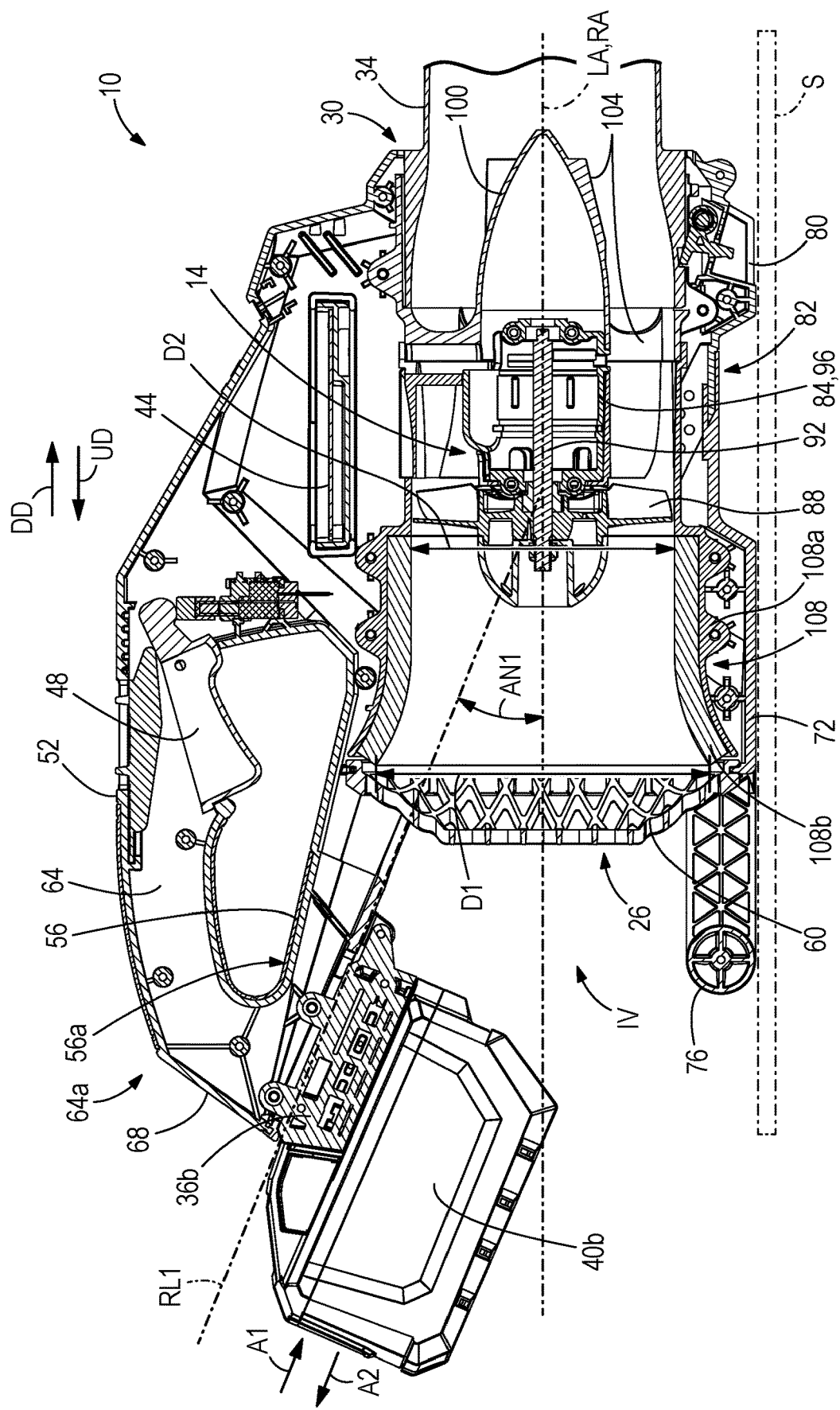
FIG. 6 is a cross-sectional view taken along section line 6-6 in FIG. 5.

FIG. 6 illustrates the fan 14 and the internal components of the housing 18 in detail. The fan 14 includes a motor 84 and an impeller 88. The motor 84 includes a rotor 92 and a stator 96. The stator 96 is secured to the fan portion 22 of the housing 18. The rotor 92 is configured to rotate along the rotational axis RA upon excitation of the fan 14 by the trigger 48. The rotor 92 is coupled to the impeller 88 for co-rotation therewith. The impeller 88 is dimensioned to generate fluid flow upon rotation of the rotor 92, the fluid being drawn in through the inlet 26 and expelled from the outlet 30. The impeller 88 is closer to the inlet 26 than the motor 84. The motor 84 is closer to the outlet 30 than the impeller 88. The fan 14 may further include a nose cone 100. The nose cone 100 may be stationary, and may be coupled to the fan portion 22 of the housing 18. The nose cone 100 is positioned further from the inlet 26 than the motor 84. The nose cone 100 may include a plurality of rectifiers 104 configured to straighten the fluid flow generated by the impeller 88. The rectifiers 104 may inhibit or dampen the generation of exhaust fluid flow vortices. As shown in FIG. 6, the inlet 26 may be funnel-shaped or bell-shaped such that fluid passing through the inlet 26 is compressed and sped up as it passes through the housing 18. Further, the exhaust tube 34 may also be funnel-shaped or bell-shaped such that fluid passing out the outlet 30 and along the exhaust tube 34 is compressed and sped up as it passes through the exhaust tube 34.

Between the intake grate 60 and the fan 14, the blower 10 includes an intake cone 108. The intake cone 108 includes a rigid housing 108a and a truncated foam bell 108b. The foam bell 108b may be configured to dampen sound generated by the fan 14. The intake cone 108 has an intake diameter D1 adjacent the intake grate 60 larger than an output diameter D2 adjacent the fan 14. The intake cone 108 varies in diameter along the longitudinal axis LA. In the illustrated embodiment, the housing 108a and the foam bell 108b are each generally truncated bell shaped with intake diameters D1 being larger than the output diameters D2 thereof. The housing 108a and the bell 108b are superimposed upon each other in a direction extending away from the longitudinal axis LA. The illustrated housing 108a is positioned further from the longitudinal axis LA than (e.g., radially outward of the) foam bell 108b. However, in other constructions, the opposite may be employed with the housing 108a positioned closer to the longitudinal axis LA than the foam bell 108b. In either construction of the intake cone 108, an interface between the housing 108a and the foam bell 108b may include an air, particulate, and/or sound permeable membrane, window, grate, reduced thickness portion, or aperture (not shown). Accordingly, sound generated by the fan 14 may be dampened by the foam bell 108b. Size, shape, and dimensions of the membrane, window, grate, reduced thickness portion, or aperture may be optimized to achieve desired sound dampening.

Although the disclosure has been described in detail with reference to certain preferred embodiments, variations and modifications exist within the scope and spirit of one or more independent aspects of the invention as described.

What is claimed is:

1. An axial blower comprising:
   a fan having a rotational axis;
   a housing surrounding the fan, the housing including
      an inlet disposed at a position along the rotational axis upstream of the fan,
      a fluid intake volume upstream of the inlet,
      an outlet disposed at a position along the rotational axis downstream of the fan,
      a distal projection extending at an acute angle away from the inlet in an upstream direction along a reference line extending from the rotational axis through the inlet, and
      a battery interface extending along the distal projection, the battery interface located upstream of the inlet, the battery interface configured to suspend a battery pack therefrom to position the battery pack in the fluid intake volume;
      an intake grate positioned between the fluid intake volume and the inlet, the intake grate configured to permit fluid flow between the fluid intake volume and the inlet; and
   wherein the fluid intake volume is unobstructed between the battery interface and the intake grate; and wherein the acute angle is formed between the rotational axis and the reference line extending from the rotational axis.

2. The axial blower of claim 1, wherein the intake grate projects in an upstream direction from the inlet.

3. The axial blower of claim 1, wherein the housing includes a handle portion having a rear end, and the distal projection includes a butt end, the housing further includes a connector portion coupling the rear end and the butt end.

4. The axial blower of claim 1, wherein when the battery pack is suspended from the battery interface, at least a portion of the inlet is offset relative to a longitudinal axis of the housing from the battery pack.

5. An axial blower comprising:
   a fan having a rotational axis; and
   a housing surrounding the fan, the housing including
      an inlet disposed at a position along the rotational axis upstream of the fan,
      an outlet disposed at a position along the rotational axis downstream of the fan,
      a distal projection extending at an acute angle away from the inlet in an upstream direction along a reference line extending from the rotational axis through the inlet, the distal projection intersected by a plane that is co-planar with the rotational axis,
      a first battery interface coupled to the distal projection on a first lateral side of the plane, and
      a second battery interface coupled to the distal projection on a second lateral side of the plane, the second lateral side being opposite the first lateral side; and
   wherein the acute angle is formed between the rotational axis and the reference line extending from the rotational axis.

6. The axial blower of claim 5, wherein
   the first battery interface is configured to engage a first battery pack having a first operating voltage,
   the second battery interface is configured to engage a second battery pack having a second operating voltage,
   the second operating voltage being the same as the first operating voltage.

7. The axial blower of claim 5, wherein the first battery interface is configured to engage a first battery pack having an operating voltage of approximately 18 volts.

8. The axial blower of claim 5, wherein
   the first battery interface is configured to engage a first battery pack having a first operating voltage,
   the second battery interface is configured to engage a second battery pack having a second operating voltage, and
   the first operating voltage and the second operating voltage together define a combined operating voltage of approximately 36 volts.

9. The axial blower of claim 5, wherein
   the first battery interface is configured to engage a first battery pack configured to apply a first electrical input power,
   the second battery interface is configured to engage a second battery pack configured to apply a second electrical input power, and
   the first input power and the second input power together define a combined input power to the fan of from 500 watts to 3000 watts.

10. The axial blower of claim 5, wherein the distal projection is disposed at an angle from the rotational axis, and the first battery interface is configured to be engaged by a first battery pack translating along the distal projection at the angle.

11. The axial blower of claim 5, further comprising a foot, wherein the first battery interface is configured to engage a first battery pack with at least a portion of the first battery pack being on an opposite side of the rotational axis when compared to the battery interface, the portion of the first battery pack being adjacent the foot.

12. The axial blower of claim 5, wherein the first battery interface and the second battery interface are electrically coupled to the fan, a printed circuit board assembly, and a trigger.

13. The axial blower of claim 5, wherein the plane intersects at least the housing and the fan.

14. The axial blower of claim 5, the first battery interface and the second battery interface are positioned the same axial distance along a longitudinal axis of the housing relative to the inlet.

15. An axial blower comprising:
   a housing including
      an inlet,
      an outlet opposite the inlet,
      a distal projection extending at an acute angle away from the inlet in an upstream direction along a reference line extending from the rotational axis through the inlet,
      a battery interface extending along the distal projection, the battery interface located upstream of the inlet, and
      a foot including a free end, the free end being upstream of the inlet;
   a fan having a rotational axis, the rotational axis passing through the inlet and the outlet; and
   a fluid intake volume defined at least partially between the distal projection and the free end of the foot; and
   wherein the acute angle is formed between the rotational axis and the reference line extending from the rotational axis.

16. The axial blower of claim 15, wherein the housing further includes an auxiliary foot positioned between the outlet and the inlet, the foot and the auxiliary foot configured to contact a surface to support the blower upon the surface.

17. The axial blower of claim 16, wherein the housing further includes an intermediate portion positioned between the foot and the auxiliary foot, the intermediate portion recessed relative to the foot and the auxiliary foot.

18. The axial blower of claim 15, wherein the foot is generally U-shaped.

19. The axial blower of claim 15, wherein the fan includes a motor and an impeller, a distance from the impeller to the inlet being less than a distance from the motor to the inlet.

20. The axial blower of claim 19, wherein the fan includes a nose cone positioned downstream from the motor.

\* \* \* \* \*